United States Patent
Wei-Ku et al.

(10) Patent No.: US 6,519,299 B1
(45) Date of Patent: Feb. 11, 2003

(54) METHODS AND APPARATUS TO DESPREAD DUAL CODES FOR CDMA SYSTEMS

(75) Inventors: Chung Wei-Ku, Yungho (TW); Fu-Yen Kuo, Hsin Chu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/256,347

(22) Filed: Feb. 24, 1999

(51) Int. Cl.[7] .............................. H03D 1/00; H04L 27/06
(52) U.S. Cl. ...................... 375/343; 375/150; 706/426
(58) Field of Search ........................... 375/343, 150, 375/142, 143, 152; 708/426, 422, 423, 424

(56) References Cited

U.S. PATENT DOCUMENTS

| | | | | |
|---|---|---|---|---|
| 4,518,947 A | * | 5/1985 | Poston et al. | 341/81 |
| 5,216,693 A | * | 6/1993 | Nakamura | 375/209 |
| 5,930,292 A | * | 7/1999 | Willis | 375/208 |
| 6,370,208 B1 | * | 4/2002 | Kuo et al. | 375/343 |

* cited by examiner

*Primary Examiner*—Phuong Phu
(74) *Attorney, Agent, or Firm*—Finnegan, Henderson, Farabow, Garrett & Dunner, L.L.P.

(57) ABSTRACT

A correlator and matched filter for use with coded transmission, such as CDMA, form new codes from the sums and differences of the original codes, where only one of the new codes is non-zero for each element position and effect hardware savings using the new codes.

18 Claims, 7 Drawing Sheets

METHODS AND APPARATUS TO DESPREAD DUAL CODES FOR CDMA SYSTEMS

I. RELATED APPLICATIONS

This application relates to an application by the same inventors entitled "A Low Complexity Correlator for Multi-code CDMA" filed on the same date as this application, and incorporated herein by reference.

II BACKGROUND OF THE INVENTION

This invention relates generally to despreaders, and more particularly to a dual-code despreader that can despread pseudonoise (PN) sequences used for Code Division Multiple Access (CDMA) systems.

The growing importance of wireless communications has increased the demand for data transmission over mobile radio channels. Although GSM standards have become very popular and data service specifications are developing, most current mobile communications still use CDMA technologies. Future multimedia transmission, however, will require wide bandwidths and high data rates, which in turn will require complex and expensive hardware.

CDMA systems use a PN sequence to "spread" input data to resist data loss in a noisy wireless environment. The transmitted baseband signal is expressed as $$S_T = \sum_i b_i[j] C_i, \quad (1)$$

where $b_i[j]$, a scalar value representing the jth bit of user i, is +1 or −1, and $C_i$, a column vector representing the PN code sequence, also has entries of either +1 or −1. The baseband signals are then summed and transmitted.

Receivers must despread the received signal back into an original input symbol by correlating the received signal with the same PN code $C_k$ used to spread the signal as follows:

$$b_k[k] = \text{sign}(C_k^T S_R). \quad (2)$$

The Sign function outputs a 1 if the input is positive and a −1 if the input is negative.

Generally, $$S_R = S_T + n, \quad (3)$$

where n represents the noise from the environment. Combining equations (1), (2), and (3) yields:

$$b_k'[k] = \text{sign}[C_k^T S_T + n], \quad (4)$$

$$= \text{sign}\left[C_k^T \sum_i (b_i[j] C_i + n)\right]$$

$$= \text{sign}\left[b_k[j] C_k^T C_k + \sum_{i \neq k} (b_i C_k^T C_i + C_k^T n)\right]$$

For orthogonal codes, $$C_k^T C_i = 0, \text{ if } i \neq k. \quad (5)$$

Also, noise n is small compared with an original signal, and $$C_k^T C_k = m, \quad (6)$$

where m is the spreading factor.

Because $b_k[j]$ is either 1 or −1, $$b_k'[j] \approx \text{sign}(b_k[j] m) \quad (7)$$

$$= b_k[j].$$

In addition to the noise signal, other user data can be regarded as another source of interference for CDMA systems.

Modern CDMA systems use either different orthogonal codes or the same code with different delays. This requires hardware that can despread several codes concurrently. Some researchers have tried to increase throughput by adding two PN sequences as the code input, with the two sequences coming from the same code with different delays.

Another system to reduce power consumption uses sign-magnitude data format and two accumulators for positive and negative partial sums, respectively, with a specialized architecture. None of these systems, however, provides a complete solution to future problems facing CDMA systems.

III. SUMMARY OF THE INVENTION

A method, consistent with this invention, of despreading an input signal spread with two original codes, comprises forming two new multi-element codes from the two original codes such that only one of the corresponding elements of each code is zero, combining the new codes with the input signal, and combining the partial results to form correlation values. Combining the new codes involves forming partial results for each of the new codes, and updating, for each element, the partial result corresponding to the new code for which the corresponding element is not zero.

A system, consistent with this invention, for despreading an input signal spread with two original codes involves forming two new multi-element codes from the two original codes such that only one of the corresponding elements of each code is zero. The apparatus comprises first adder means for combining the new codes with the input signal, and adder subtractor means for combining the partial results to form correlation values. The first adder means includes means for forming partial results for each of the new codes, and means for updating, for each element, the partial result corresponding to the new code for which the corresponding element is not zero.

A dual-code correlator, consistent with this invention, is coupled to an input signal and a pair of multi-element codes designed such that only one of the corresponding elements of each code is zero, and comprises a decoder element receiving the input signal and the codes, an adder coupled to the output of the decoder element and a register bank containing partial results, and an adder/subtractor circuit to form correlation results from the partial results.

Another dual code correlator, consistent with this invention, is coupled to an input signal and a pair of multi-element codes designed such that only one of the corresponding elements of each code is zero, and comprises an adder circuit receiving the input signal and a partial result, a register bank containing a plurality of partial results, steering circuits for directing the output of the adder circuit to the register circuit and for directing the appropriate one of the partial results to the adder circuit, and an adder/subtractor circuit to form correlation results from the partial results.

A matched filter, consistent with this invention, comprises a plurality of filter stages connected sequentially, and an adder/subtractor circuit connected to the outputs of the last of the filter stages in the sequence for forming the filter output. Each of the stages includes an adder receiving an input signal and an output from a previous stage, the first of the stages in the sequence receiving a fixed input, and a register bank to hold the output of the adder as an output of that stage.

Both the foregoing general description and the following detailed description are exemplary and do not restrict the invention claimed. The accompanying drawings, which are incorporated in and constitute a part of this specification, illustrate systems and methods consistent with the invention and, together with the description, explain the principles of the invention.

IV. BRIEF DESCRIPTION OF THE DRAWINGS

V. DETAILED DESCRIPTION OF THE PREFERRED EMBODIMENTS

A. Principles of Operation

1. Dual Code Despreading

Figure 1:
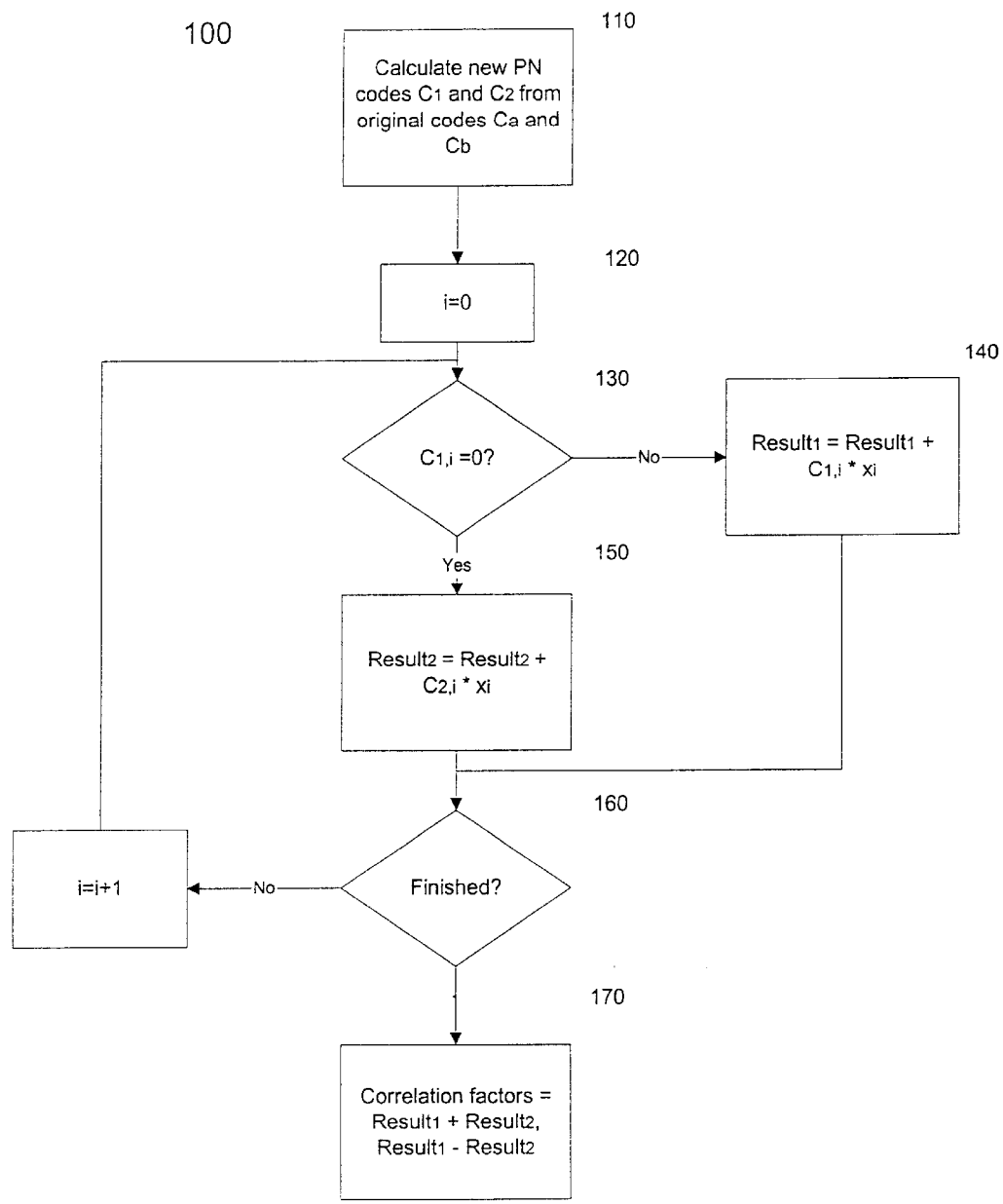
FIG. 1 is a flow diagram of the operations for despreading consistent with this invention.

Systems and methods consistent with the present invention generate two new codes from two original PN codes that can be orthogonal or the same with different delays. Proper use of the new codes allows the correlator hardware to be designed with fewer elements and greater speed.

The two new codes are generated from the original codes $C_a$ and $C_b$ as follows:

$$C_1 = (C_a + C_b)/2$$

$$C_2 = (C_a - C_b)/2 \quad (8)$$

The elements of $C_a$ and $C_b$ are either 1 or $-1$, so the elements of $C_1$ and $C_2$ are 1, $-1$, or 0. Moreover, if $C_{1,i}$ represents the ith entry of vector $C_1$, then $$C_{1,i} = 0 \text{ if } C_{2,i} \neq 0,$$

and $$C_{1,i} \neq 0 \text{ if } C_{2,i} = 0. \quad (9)$$

If the transmitted signals include data from two users then:

$$S = b_a[j]C_a + b_b[j]C_b. \quad (10)$$

To simplify the process, assume noise is zero or negligible. As a result, correlating this signal with the redesigned new codes yields:

$$b_1 = C_1^T S \quad (11)$$
$$= (C_a^T + C_b^T)S/2$$
$$= (b_a[j] + b_b[j])m/2.$$

Similarly, $$b_2 = C_2^T S \quad (12)$$
$$= (C_a^T - C_b^T)S/2$$
$$= (b_a[j] - b_b[j])m/2.$$

Therefore, the following results can be obtained by addition:

$$b_a[j] = \text{sign}(b_1 + b_2) \quad (13)$$
$$= \text{sign}(b_a[j]m)$$
$$= b_a[j]$$

$$b_b[j] = \text{sign}(b_1 - b_2)$$
$$= \text{sign}(b_a[j]m)$$
$$= b_a[j]$$

The total number of computations for $C_1$ and $C_2$ equals the spreading factor. As will become apparent below, systems and methods consistent with this application require only two extra addition/subtraction operations at the end to perform a correlation using the two new codes.

2. Despreading Process

FIG. 1 is a flow diagram 100 of the operations for despreading consistent with this invention. First, the new PN codes $C_1$, $C_2$ are calculated from the original codes $C_a$ and $C_b$ (step 110). Then a loop begins (step 120) in which the ith element of PN code $C_1$ is compared to zero (step 130). If they are not equal, then a value, Result$_1$, is incremented by the product of the ith element of code $C_1$ and the ith element of the input signal (step 140). Otherwise, Result$_2$ is incremented by the product of the ith element of code $C_2$ and the ith element of the input signal (step 150). If there are additional elements of the input signal and of the PN codes (step 160), then i is incremented by 1 (step 165) and the loop repeats. Otherwise, the correlation factors are calculated as a sum and difference between Result$_1$ and Result$_2$ (step 170).

3. Examples

To demonstrate the equivalence of the new codes to the original codes, assume the two original codes are Walsh codes, $[1\ -1\ 1\ -1]^T$ and $[1\ 1\ -1\ -1]^T$. The two new codes, from Eq. 8 become $[1\ 0\ 0\ -1]^T$ and $[0\ -1\ 1\ 0]^T$. Correlating an input, $[4\ -2\ 3\ -3]^T$, with these two codes yields:

$[1\ 0\ 0\ -1][4\ -2\ 3\ -3]^T = 7$,
$[0\ -1\ 1\ 0][4\ -2\ 3\ -3]^T = 5$.

The operations for multiply and accumulate are the same as for single code despreading, so the correct correlation values can be obtained as $(7+5)=12$ and $(7-5)=2$.

To verify the accuracies of these results, the conventional approach yields the same results:

$[1\ -1\ 1\ -1][4\ -2\ 3\ -3]^T=12$, and $[1\ 1\ -1\ -1][4\ 2\ -3\ -3]^T=2$.

B. Hardware Implementations

1. Two's-complement Representation

Figure 2:
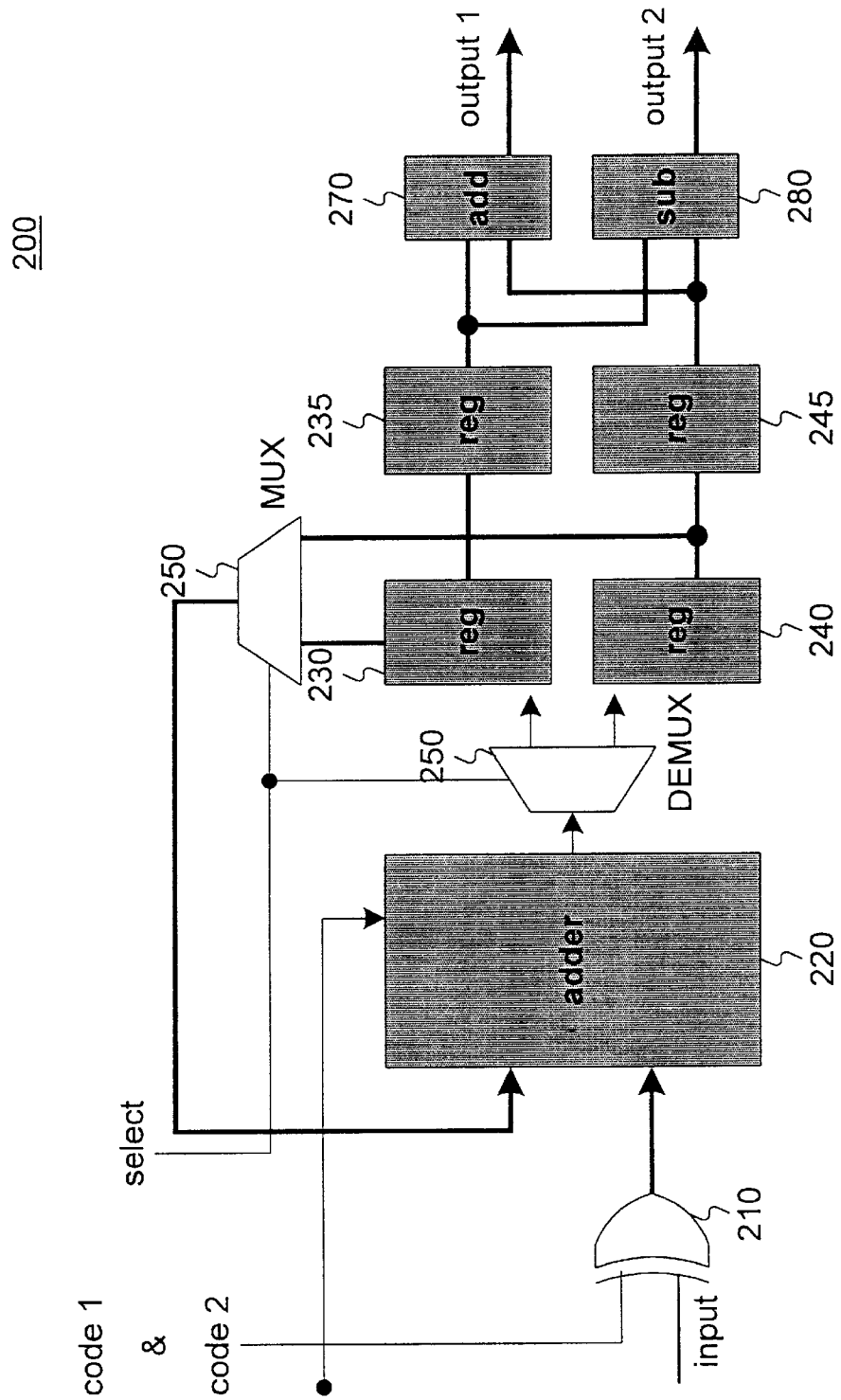
FIG. 2 is a block diagram of a system, consistent with this invention, for a two's-complement representation of input signals.

FIG. 2 shows a system 200, consistent with this invention, for a two's-complement representation of input signals. System 200 includes a decoder or multiplier (e.g. XOR gate) 210 to multiply the codes by the input signal. A first adder 220 adds the output of the multiplier to the partial correlation results in either register 230 or 240, the register to be selected by multiplexer 250. The output of the first adder goes to either registers 230 or 240 according to demultiplexer 260. Both multiplexer 250 and demultiplexer 260 are controlled by a "select" signal derived from the codes. The "select" signal selects the proper registers according to the one of the codes that is not zero.

System 200 also includes buffer registers 235 and 245. The inputs of buffer registers 235 and 245 connect to registers 230 or 240, respectively, and their outputs connect to second adder 270 and subtractor 280. Adder 270 and subtractor 280 form the correct correlation values. Because one of the two new codes is always zero, the system needs to add the output of multiplier 210 to only one partial result, thus the system needs only one first adder 210.

System 200 can also be implemented in a bit-serial manner if the spreading factor is larger than the word-length. This also allows the second adder to operate slower than the first adder.

In addition, the dynamic range of the adder can be reduced. This is because the non-zero portions of the sum or difference of orthogonal PN sequences are about half their length due to the nature of PN sequences and orthogonality.

2. Sign-Magnitude Representation

A system consistent with this invention that can provide a lower power design uses sign-magnitude representation. Such a representation generally has fewer transitions between states, which will consume less power in most CMOS implementations. One known architecture reduces the power consumption of the receiver using two correlators, one for positive values and the other for negative values. That architecture can be adapted for use with the two new codes to provide improved receivers.

Figure 3A:
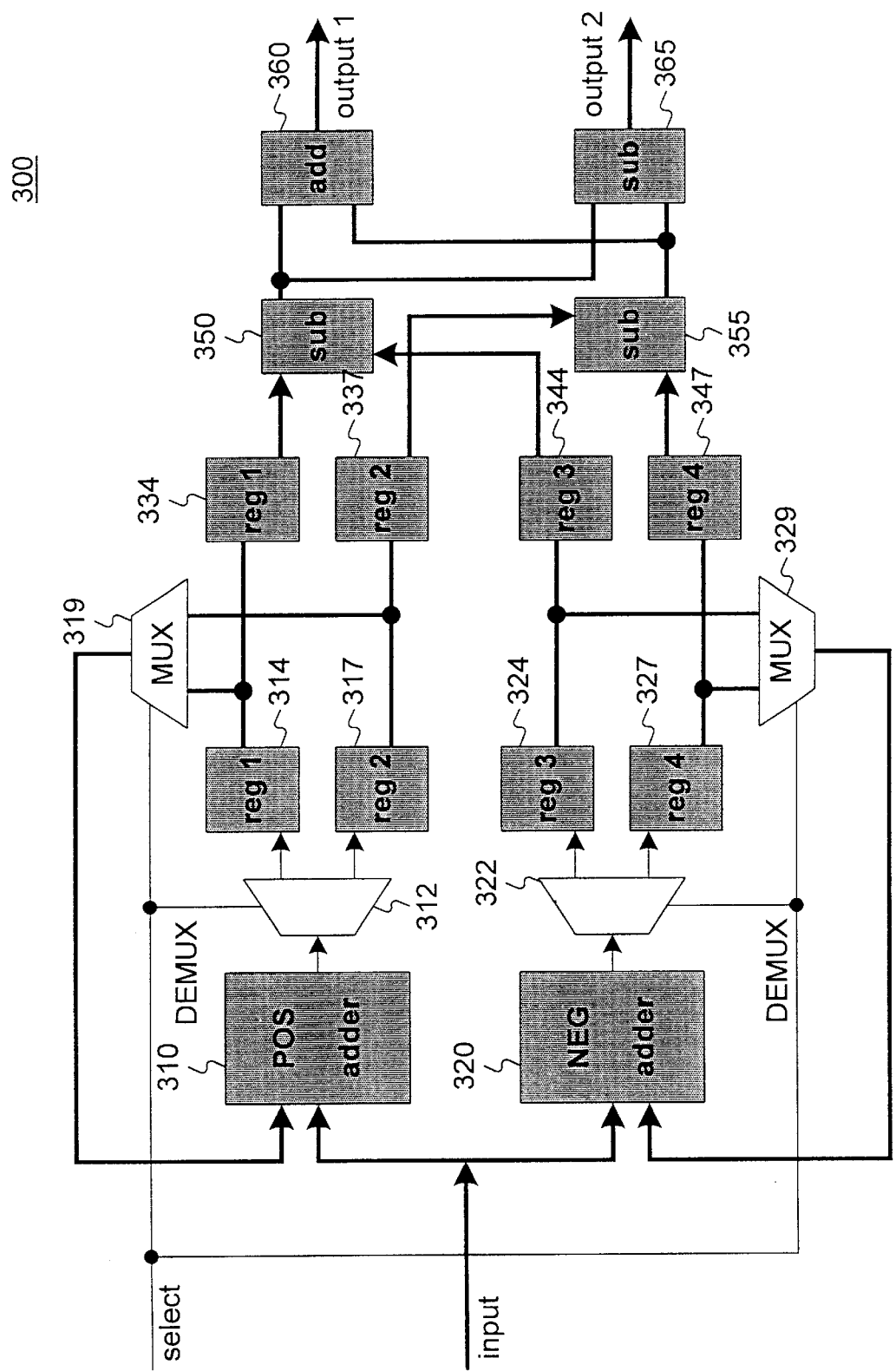
FIGS. 3A and 3B are block diagrams of systems consistent with the invention for signals in sign-magnitude representation of input signals.

FIG. 3A shows a system 300 consistent with the invention for signals in sign-magnitude representation. System 300 includes an adder 310 for positive values and an adder 320 for negative values. Each adder has an associated demultiplexer, demultiplexer 312 for adder 310 and demultiplexer 322 for adder 320. The demultiplexers route partial sums to one of two associated registers, depending upon which code is zero. Registers 314 and 317 store the partial sums from adder 310 and provide an input to adder 310 through multiplexer 319, and registers 324 and 327 store partial sums from adder 320 and provide an input to adder 320 through multiplexer 329. A "select" signal for multiplexers 319 and 329 and for demultiplexers 312, 322 works as described above for system 200 in FIG. 2. In addition, registers 334 and 337 store the outputs of registers 314 and 317, respectively, and registers 344 and 347 store the outputs from registers 324 and 327, respectively.

With regard to these elements, the sign magnitude implementation in FIG. 3A resembles the two's-complement circuits from FIG. 2 if one circuit is used for positive values and one circuit is used for negative values. Again, only two adders are needed because the value of one of the codes will always be 0.

The final elements of system 300 are subtractor 350 to subtract the negative values from register 344 from the positive values in register 334, and subtractor 355 to subtract the negative values from register 347 from the positive values in register 337. Adder 360 and subtractor 365 then determine the correct correlation values.

Figure 3B:
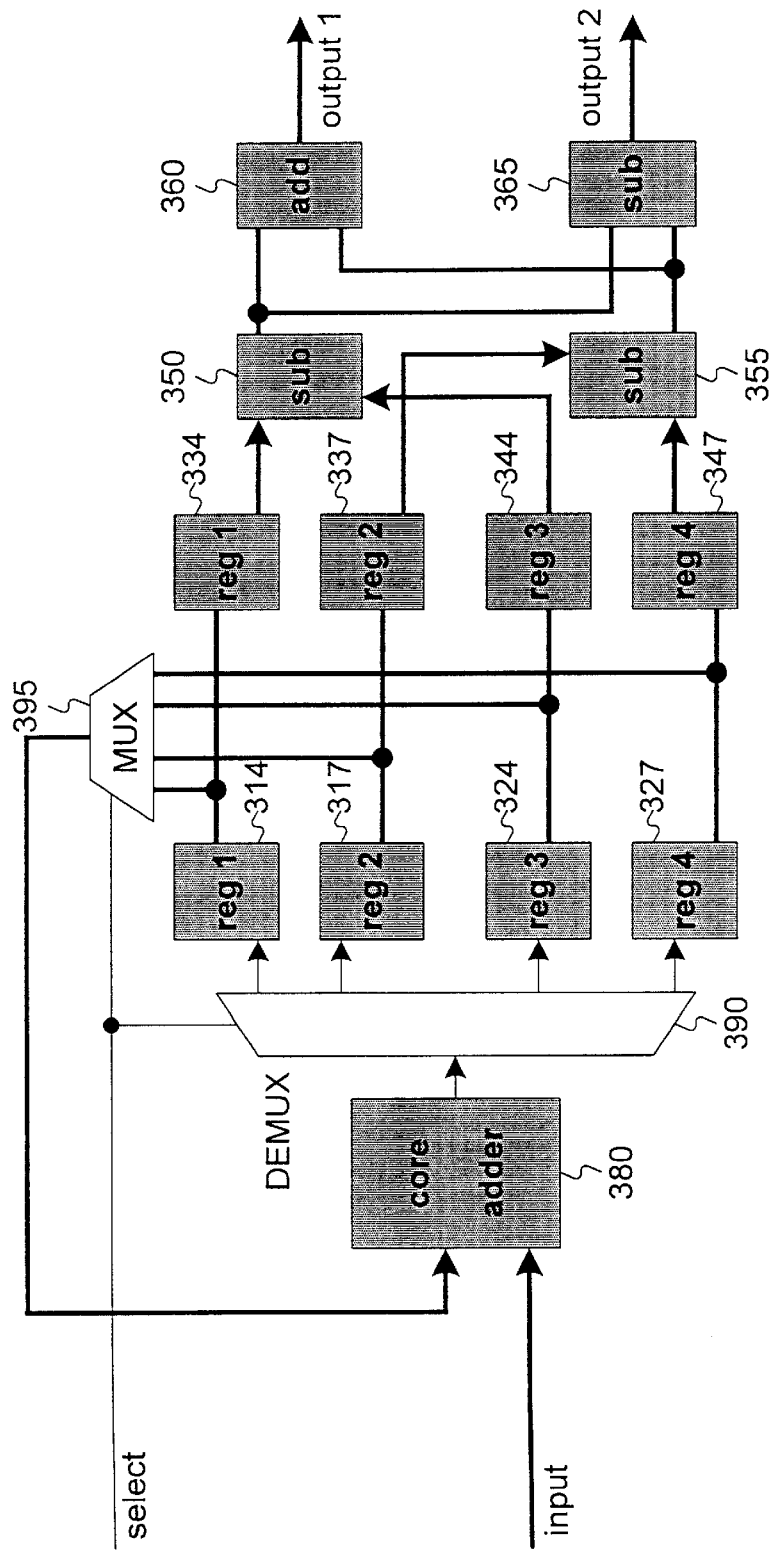

FIG. 3B shows a similar system 370 with one core adder 380, one demultiplexer 390, and one multiplexer 395. Such an architecture is possible because only one of adders 310 and 320 is in use at any one time. In such a system, the "select" signal indicates which code is not zero and the sign of the code.

Alternatively, a gated clock can also be applied to control the data flow and reduce power consumption. The dynamic range of elements 230, 235, 240, 245 can be reduced by 1 bit (and the dynamic range of elements 314, 317, 324, 327, 334, 337, 344, 347 can be reduced by 2 bits) because the probability of a "1" or "−1" is about equal. Bit-serial adder/subtractors, which have fewer elements, can also be used to save hardware costs.

3. Chip-Matched Filter Architecture

Figure 4:
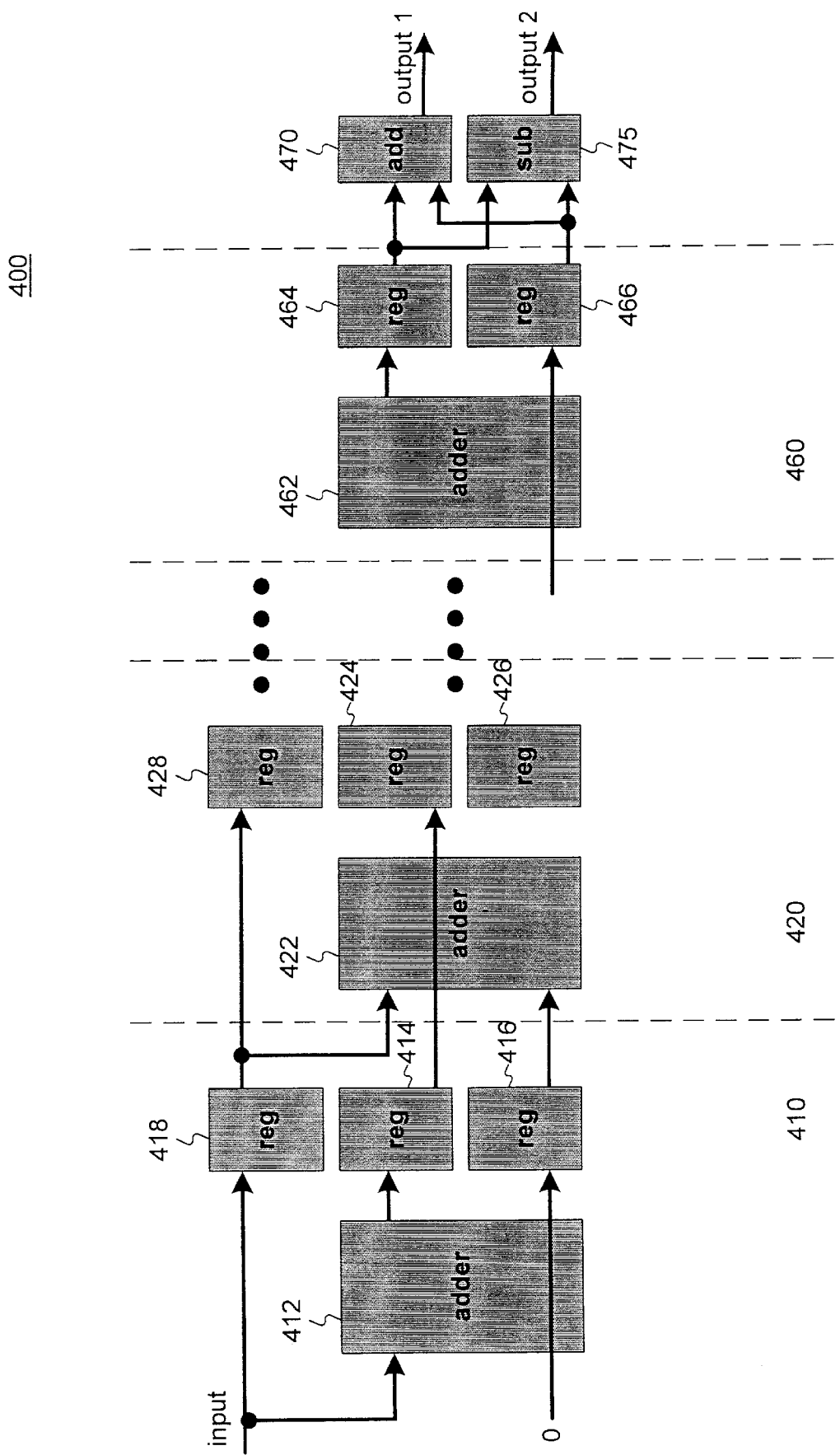
FIG. 4 is a block diagram of dual-code, chip-matched filter consistent with this invention.

The use of two codes can also be applied to a chip-matched filter design. FIG. 4 shows one possible architecture for dual-code, chip-matched filter 400. Because the coefficients of the matched filter are set at +1 or −1, most of the structure can be hardwired, eliminating the need for a multiplexer.

Filter 400 contains several stages 410, 420, . . . 460. Each stage includes adder 412, 422, . . . 462, two registers to hold the partial results, 414/416, 424/426, . . . 464/466, some stages have a register 418, 428 to hold the input signal. Only an additional adder 470 and subtractor 475 are needed to generate the correct outputs, thus realizing significant hardware savings for very long matched codes. This is because the adder at each stage just accumulates one of the new codes to correlate the partial results. Thus, hardwiring the new codes in the adders allows the adders just to decide whether to add the positive or negative inputs with one of the partial-result registers.

Both two's-complement and sign-magnitude representations are possible, but only the two's-complement result is shown. Bit-serial techniques cannot be applied to the final adder/subtractor due to the pipelined constraint.

C. Complexity Analysis

Table 1 contains a hardware complexity analysis. Each heading, except the first and last, identifies the type of component used in the associated circuit, and the number in parentheses represents the number of transistor gates for the component. The numbers in the columns represent the number of gates needed for 1-bit implementation. The design of the multiplexer/demultiplexers assumes pass transistors are the word-length of the input is four bits, and the spreading factor is 16. As a result, an 8-bit adder is typically needed for the correlator.

Only seven bits are used for system 300 in FIG. 3, but two bit-serial adder/subtractors are appended, so Table 1 lists nine 1-bit adders. Similarly, 6-bit adders are used for architecture 400 in FIG. 4, but four bit-serial adders/subtractors are needed.

TABLE 1

Complexity comparison of several architectures

| Architecture | XOR gates (3) | Adders (10) | Registers (6) | Demux/Mux (1) (pass transistor) | Total gates |
|---|---|---|---|---|---|
| Standard 2's complement | 4 | 8 | 16 | 0 | 288 |
| 2 × standard 2's complement | 8 | 16 | 32 | 0 | 576 |
| System 200 | 4 | 9 | 28 | 14 | 384 |
| System 300 | 0 | 16 | 48 | 48 | 496 |
| System 370 | 0 | 10 | 48 | 48 | 436 |
| Standard chip matched-filter | 32 | 128 | 192 | 0 | 2528 |
| 2 × standard chip matched filter | 64 | 256 | 384 | 0 | 5056 |
| System 400 | 32 | 128 | 288 | 0 | 3104 |

Figure 5:
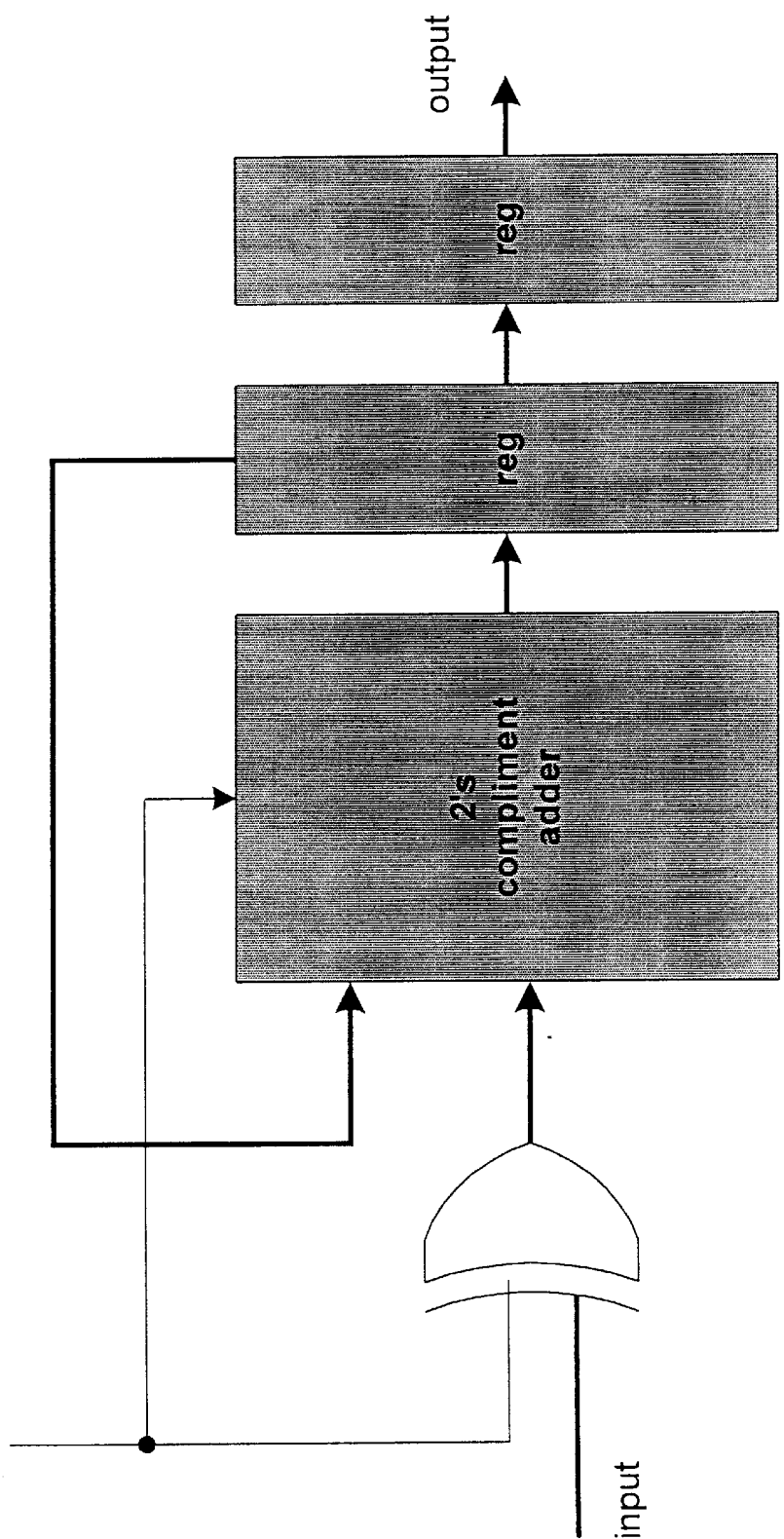
FIG. 5 is a block diagram of standard design of a correlator for purposes of comparing the complexity of conventional designs with systems consistent with this invention.
Figure 6:
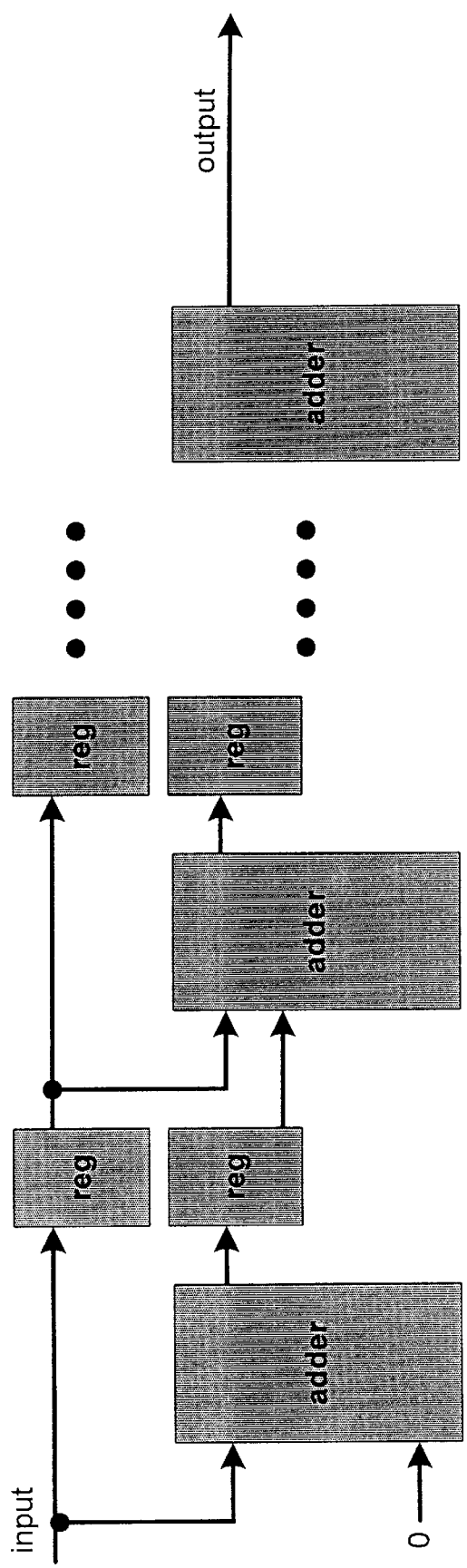
FIG. 6 is a block diagram of a standard design of a matched filter for purposes of comparing the complexity of conventional designs with systems consistent with this invention.

FIG. 5 shows the standard design of a correlator for each code, and FIG. 6 shows a standard design of a matched filter for each code. The proper comparisons are between the 2× standard designs and systems 200, 300, 370, and 400 because one of the standard designs would be needed for each code.

D. Conclusion

The specific hardware used to implement the correlators and the chip-matched filters is not critical to this invention. Persons of ordinary skill in the art will know to use whatever technologies or circuit designs are appropriate for their particular needs while still taking advantage of the savings attendant the present invention. Therefore, the scope of the appended claims is not to be limited to those specific examples.

What is claimed is:

1. A method of despreading an input signal spread with two original codes, comprising
   forming two new multi-element codes from the two original codes such that only one of the corresponding elements of each code is zero;
   combining the new codes with the input signal by
      forming partial results for each of the new codes, and
      updating, for each element, the partial result corresponding to the new code for which the corresponding element is not zero; and
   combining the partial results to form correlation values.

2. The method of claim 1, wherein forming two new multi-element codes includes
   taking one-half the sum of the original codes, and
   taking one-half the difference between the original codes.

3. The method of claim 1, wherein forming partial results for each of the new codes includes
   providing an XOR operation between the input signal and the new codes.

4. The method of claim 1, wherein forming partial results for each of the new codes includes
   adding the input signal to one of two partial sums according to the sign of the input signal.

5. The method of claim 1, wherein updating the partial result includes
   adding a new value to a previous partial result.

6. The method of claim 1, wherein combining the partial results includes forming a sum and a difference of the partial results.

7. A system for despreading an input signal spread with two original codes by forming two new multi-element codes from the two original codes such that only one of the corresponding elements of each code is zero, comprising:
   first adder means for combining the new codes with the input signal including
      means for forming partial results for each of the new codes, and
      means for updating, for each element, the partial result corresponding to the new code for which the corresponding element is not zero; and
   adder subtractor means for combining the partial results to form correlation values.

8. The system of claim 7, wherein the two new multi-element codes include
   one-half the sum of the original codes, and
   one-half the difference between the original codes.

9. The system of claim 7, wherein the means for forming partial results for each of the new codes includes
   an XOR gate.

10. The system of claim 7, wherein the means for forming partial results for each of the new codes includes
    a pair of adders, each corresponding to a different sign of the input signal.

11. The system of claim 7, wherein the means for updating the partial result includes
    an adder.

12. The system of claim 7, wherein the adder/subtractor means for combining the partial results includes
    an adder, and
    a subtractor.

13. A dual-code correlator coupled to an input signal and a pair of multi-element codes designed such that only one of the corresponding elements of each code is zero, the correlator comprising
    a decoder element receiving the input signal and the codes;
    an adder coupled to the output of the decoder element and a register bank containing partial results; and
    an adder/subtractor circuit to form correlation results from the partial results.

14. The correlator of claim 13, wherein the register bank includes
    first and second registers each corresponding to a different one of the codes; and
    wherein the correlator further includes
       a demultiplexer coupled between the output of the adder and the inputs of the first and second registers to direct the output of the adder to one of the first and second registers according to a select signal, and
       a multiplexer coupled between the outputs of the first and second registers and an input of the adder to direct the output of one of the first and second registers to the input of the adder according to the select signal; and
    wherein the select signal indicates the one of the codes for which the current element is not zero.

15. The correlator of claim 13, wherein the register bank includes
    first and second registers each corresponding to a different one of the codes; and
    wherein the correlator further includes
       a control circuit generating a first gated clock signal to direct the output of the adder to one of the first and second registers according to a select signal, and a second gated clock signal to direct the output of one of the first and second registers to the input of the adder according to the select signal.

16. The correlator of claim 13, further including a third and fourth registers coupled between the first and second registers, respectively, and the adder/subtractor circuit.

17. The correlator of claim 13, wherein the decoder element includes an XOR gate.

18. The correlator of claim 17, wherein the adder/subtractor circuit includes an adder; and a subtractor.

* * * * *